US012746940B2

(12) United States Patent
Kim

(10) Patent No.: US 12,746,940 B2
(45) Date of Patent: Sep. 29, 2026

(54) AUTOMATED SYSTEM FOR AUTONOMOUS DRIVING OF A VEHICLE AND A METHOD FOR THE SAME

(71) Applicants: Hyundai Motor Company, Seoul (KR); KIA CORPORATION, Seoul (KR)

(72) Inventor: Jeong Hun Kim, Seoul (KR)

(73) Assignees: Hyundai Motor Company, Seoul (KR); KIA CORPORATION, Seoul (KR)

( * ) Notice: Subject to any disclaimer, the term of this patent is extended or adjusted under 35 U.S.C. 154(b) by 336 days.

(21) Appl. No.: 18/232,571

(22) Filed: Aug. 10, 2023

(65) Prior Publication Data

US 2024/0132097 A1 Apr. 25, 2024
US 2024/0227846 A9 Jul. 11, 2024

(30) Foreign Application Priority Data

Oct. 19, 2022 (KR) ........................ 10-2022-0134579

(51) Int. Cl.
*B60W 60/00* (2020.01)
*G01C 21/34* (2006.01)

(52) U.S. Cl.
CPC ....... *B60W 60/001* (2020.02); *G01C 21/3461* (2013.01); *B60W 2552/20* (2020.02); *B60W 2552/53* (2020.02); *B60W 2554/00* (2020.02); *B60W 2556/40* (2020.02); *G01C 21/3415* (2013.01)

(58) Field of Classification Search
CPC ........... B60W 60/001; B60W 2554/00; B60W 2552/20; B60W 2552/53; B60W 2556/40; G01C 21/3461; G01C 21/3415
USPC .......................................................... 701/25
See application file for complete search history.

(56) References Cited

U.S. PATENT DOCUMENTS

2006/0100778 A1* 5/2006 Lee .................... G01C 21/3415 701/414
2012/0083964 A1 4/2012 Montemerlo et al.
2016/0138924 A1* 5/2016 An ......................... G01C 21/34 701/25
2017/0192423 A1* 7/2017 Rust ..................... G05D 1/0212
2018/0245938 A1* 8/2018 Song .................. G01C 21/3492
2018/0281191 A1* 10/2018 Sinyavskiy ............ B25J 9/1666
(Continued)

FOREIGN PATENT DOCUMENTS

CN 108764581 A 11/2018
CN 113961661 A * 1/2022 ............. G06F 16/29
(Continued)

*Primary Examiner* — Hunter B Lonsberry
*Assistant Examiner* — Helen Li
(74) *Attorney, Agent, or Firm* — Banner & Witcoff, Ltd.

(57) ABSTRACT

An apparatus for autonomous driving of a vehicle may comprise a processor configured to execute instructions stored in a memory to cause the apparatus to perform receiving, from a navigation system, a first path, generating, based on the first path, a second path, and autonomously driving, following the second path, the vehicle, analyzing information provided from at least one of a sensor module of the vehicle or an external server, determining, based on an error range and a location of the vehicle, whether the vehicle deviates from the first path or the second path, and generating, based on the determining, a third path.

19 Claims, 9 Drawing Sheets

(56) References Cited

U.S. PATENT DOCUMENTS

| | | | | |
|---|---|---|---|---|
| 2018/0321055 | A1* | 11/2018 | Mo | G01C 21/26 |
| 2019/0031202 | A1* | 1/2019 | Takeda | B60T 8/17557 |
| 2019/0061780 | A1* | 2/2019 | Han | G05D 1/0061 |
| 2020/0378777 | A1* | 12/2020 | Canella | G01C 21/3484 |
| 2021/0108929 | A1* | 4/2021 | Zhang | G01C 21/3438 |
| 2021/0180977 | A1* | 6/2021 | Wiesenberg | G01C 21/3492 |
| 2022/0082403 | A1* | 3/2022 | Shapira | G01C 21/3602 |
| 2022/0390954 | A1* | 12/2022 | Klingensmith | G05D 1/0219 |
| 2023/0095772 | A1* | 3/2023 | Kim | B60W 50/14<br>701/93 |

FOREIGN PATENT DOCUMENTS

| | | | | |
|---|---|---|---|---|
| CN | 115033651 | A * | 9/2022 | G06F 16/245 |
| JP | 2007-3277 | A | 1/2007 | |
| JP | 2018-189528 | A | 11/2018 | |
| KR | 102303981 | B1 | 9/2021 | |
| KR | 10-2022-0003995 | A | 1/2022 | |

* cited by examiner

AUTOMATED SYSTEM FOR AUTONOMOUS DRIVING OF A VEHICLE AND A METHOD FOR THE SAME

CROSS-REFERENCE

The present application claims priority to Korean Patent Application No. 10-2022-0134579, filed on Oct. 19, 2022, the entire contents of which is incorporated herein by reference in its entirety.

TECHNICAL FIELD

The present disclosure relates to an automated system for autonomous driving of a vehicle and a method for the same.

BACKGROUND

While an autonomous vehicle being driven along a global or local path, the path may include a road under construction, or the autonomous vehicle may fail to cut in for a next left/right turn, which causes the autonomous vehicle to deviate from the path.

If the vehicle deviates from the path, the vehicle may not determine which road to ride on until the navigation regenerates and provide a new global path.

Additionally or alternatively, the navigation may generate a new path including the road under construction, and it causes the autonomous vehicle not to arrive at the destination within the scheduled time.

SUMMARY

According to the present disclosure, an apparatus for driving of a vehicle, the apparatus may comprise a processor; and a memory storing instructions that, when executed by the processor, cause the apparatus to perform: receiving, from a navigation system, a first path; generating, based on the first path, a second path; autonomously driving, following the second path, the vehicle; analyzing information provided from at least one of a sensor module of the vehicle or an external server; determining, based on an error range and a location of the vehicle, whether the vehicle deviates from the first path or the second path; and generating, based on the determining, a third path.

The autonomously driving may comprise autonomously driving, following the third path, the vehicle, until receiving a newly generated path from the navigation system. The generating the second path may be based on a high definition (HD) map which covers: a first range ahead of a current location of the vehicle; and a second range in rear of the current location, the second range being smaller than the first range. The information may comprise at least one of: a distance to an object; a direction and a speed of the object; road sign information; traffic sign information; road construction sign information; or information of another vehicle driving on an adjacent lane.

If the vehicle deviates from the first path or the second path, the instructions, when executed by the processor, may further cause the apparatus to perform: determining a first road which is along the first path and a plurality of roads directed differently from the first road; and obtaining a dot product of: a first vector along the first road; and a comparison vector along each of the plurality of roads.

The generating the third path may comprise determining, among the plurality of roads, a road of which the comparison vector makes a greatest dot product with the first vector; and including the determined road in the third path. The first path may comprise a global path based on a standard definition (SD) map. The second path may comprise a local path based on a high definition (HD) map. If the vehicle deviates from the first path or the second path, the instructions, when executed by the processor, may further cause the apparatus to perform: determining, among a plurality of roads ahead of the vehicle, a road having a greatest number of lanes; and including the determined road in the third path.

If the vehicle deviates from the first path or the second path, the instructions, when executed by the processor, may further cause the apparatus to perform: determining, among a plurality of roads ahead of the vehicle, a road on which the vehicle is unable to be autonomously driven; and excluding the determined road from the third path. If the vehicle deviates from the first path or the second path, the instructions, when executed by the processor, may further cause the apparatus to perform: determining, among a plurality of roads ahead of the vehicle, a road having a U-turn lane; and including the determined road in the third path.

According to the present disclosure, a method for driving a vehicle, the method may comprise receiving, from a navigation system, a first path; generating, based on the first path, a second path; analyzing information provided from at least one of a sensor module of the vehicle or an external server; determining, based on an error range and a location of the vehicle, whether the vehicle deviates from the first path or the second path; and generating, based on the determining, a third path. The method may further comprise autonomously driving, following the third path and until receiving a newly generated path from the navigation system, the vehicle.

The generating of the second path may be based on a high definition (HD) map which covers: a first range ahead of a current location of the vehicle; and a second range in rear of the current location, the second range being smaller than the first range. The information may comprise at least one of: a distance to an object; a direction and a speed of the object; road sign information; traffic sign information; road construction sign information; or information of another vehicle driving on an adjacent lane. The method may further comprise: determining a first road which is along the first path and a plurality of roads directed differently from the first road; and obtaining a dot product of: a first vector along the first road; and a comparison vector along each of the plurality of roads.

The generating of the third path may comprise: determining, among the plurality of roads, a road of which the comparison vector makes a greatest dot product with the first vector; and including the determined road in the third path. The first path may comprise a global path based on a standard definition (SD) map. The second path may comprise a local path based on a high definition (HD) map. The third path may comprise, among a plurality of roads ahead of the vehicle, a road having a greatest number of lanes. The method may further comprise: determining, among a plurality of roads ahead of the vehicle, a road on which the vehicle is unable to be autonomously driven; and excluding the determined road from the third path. The third path comprises, among a plurality of roads ahead of the vehicle, a road having a U-turn lane.

BRIEF DESCRIPTION OF DRAWINGS

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, the same reference numerals refer to the same or equivalent parts of the present disclosure throughout the several figures of the drawing.

DETAILED DESCRIPTION

Figure 1:
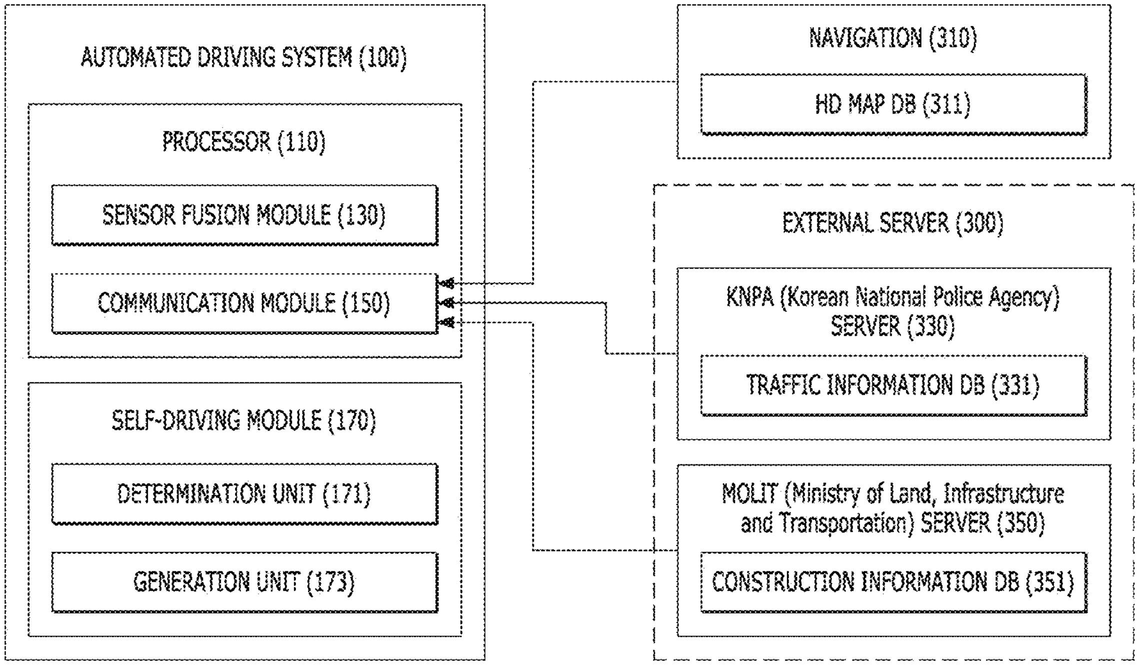
FIG. 1 shows an example of an automated driving system of a vehicle.

Reference will now be made in detail to various examples of the present disclosure(s), examples of which are illustrated in the accompanying drawings and described below. While the present disclosure(s) will be described in conjunction with examples of the present disclosure, it will be understood that the present description is not intended to limit the present disclosure(s) to those examples of the present disclosure. On the other hand, the present disclosure (s) is/are intended to cover not only the examples of the present disclosure, but also various alternatives, modifications, equivalents and other examples, which may be included within the spirit and scope of the present disclosure as defined by the appended claims.

In case where identical elements are included in various examples, they will be given the same reference numerals, and redundant description thereof will be omitted. In the following description, the terms "module" and "unit" for referring to elements are assigned and used interchangeably in consideration of convenience of explanation, and thus, the terms per se do not necessarily have different meanings or functions.

Furthermore, in describing the examples, if it is determined that a detailed description of related publicly known technology may obscure the gist of the examples, the detailed description thereof will be omitted. The accompanying drawings are used to help easily explain various technical features and it should be understood that the examples presented herein are not limited by the accompanying drawings. Accordingly, the present disclosure should be construed to extend to any alterations, equivalents and substitutes Additionally or alternatively to those which are particularly set out in the accompanying drawings.

Although terms including ordinal numbers, such as "first", "second", etc., may be used herein to describe various elements, the elements are not limited by these terms. These terms are generally used to distinguish one element from another.

If an element is referred to as being "coupled" or "connected" to another element, the element may be directly coupled or connected to the other element. However, it should be understood that another element may be present therebetween. In contrast, if an element is referred to as being "directly coupled" or "directly connected" to another element, it should be understood that there are no other elements therebetween.

A singular expression includes the plural form unless the context clearly dictates otherwise.

In the example, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

Unless otherwise defined, all terms including technical and scientific ones used herein have the same meanings as those commonly understood by one of ordinary skill in the art to which this invention belongs. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Furthermore, the term "unit" or "control unit" included in the names of a hybrid control unit (HCU), a motor control unit (MCU), etc. is merely a widely used term for naming a controller configured for controlling a specific vehicle function, and does not mean a generic functional unit. For example, each controller may include a communication device that communicates with another controller or a sensor to control a function assigned thereto, a memory that stores an operating system, a logic command, input/output information, etc., and one or more processors that perform determination, calculation, decision, etc. for controlling a function assigned thereto.

The foregoing descriptions of specific examples of the present disclosure have been presented for purposes of illustration and description. They are not intended to be exhaustive or to limit the present disclosure to the precise forms disclosed, and obviously many modifications and variations are possible in light of the above teachings. The examples are chosen and described to explain certain principles of the present disclosure and their practical application, to enable others skilled in the art to make and utilize various examples of the present disclosure, as well as various alternatives and modifications thereof. It is intended that the scope of the present disclosure be defined by the Claims appended hereto and their equivalents.

One or more examples of the present disclosure are described in detail in reference to the accompanying drawings. The same reference numerals presented in each drawing denote the same parts or elements.

FIG. 1 shows an example of an automated driving system of a vehicle.

Referring to FIG. 1, the automated driving system may include a processor 110 and a non-transitory computer-readable storage medium (not shown). The processor 110 may include a computer, a microprocessor, a CPU, an ASIC, a circuitry, a logic circuits, etc. and the storage medium may include a hard disk drive (HDD), a solid-state drive (SSD), a silicon disk drive (SDD), a ROM, a RAM, a CD-ROM, a magnetic tape, a floppy disk, and/or an optical data storage device, etc. In the present example, the storage medium and the processor may be implemented as separate semiconductor circuits. Alternatively or additionally, they may be implemented as a single integrated semiconductor circuit. The processor 110 may be as one or more processor(s).

The processor 110 may comprise a sensor fusion module 130, a communication module 150, and an autonomous driving module 170.

The processor 110 may receive traffic information, (road) construction information, and the like, which may be received respectively from external server 300 through the communication module 150.

The processor 110 may generate or extract current location information of the vehicle by use of the global position system (GPS).

The processor 110 may receive high definition (HD) map data (hereinafter, simply referred to as 'HD map') and a first path provided by the navigation 310. The vehicle may receive continually the HD map by a predetermined range section from an external map server, storing the data in a memory. For example, the HD map covers a first distance range ahead of the vehicle and a second distance range of the other directions. Also, for example, the vehicle may comprise the navigation 310 without being limited thereto and the HD map data may be stored in a memory in the navigation 310.

Upon a destination being determined, the navigation 310 may generate a first path based on a standard definition (SD) or navigation map. The processor 110 may receive the first path from the navigation 310. The autonomous driving module 170 may generate a second path based on the HD map and the first path, and the automated driving system 100 of a vehicle may perform the autonomous driving along the second path. The first path may be a global path which may be a road-level path including turn-by-turn (TBT) information and the second path may be a local path which may be a lane-level path. A detailed description thereof will be described later.

Additionally or alternatively, in the present disclosure, the processor 110 may receive object information from the sensor fusion module 130 mounted in the vehicle, which may be used by the autonomous driving module 170. For example, the object information may include the distance of each object from the vehicle, and the heading direction, the speed, etc. And also the processor 110 may receive information include an obstacle information sensed in front of the vehicle, road sign information, a road display informing on traffic situation, a construction sign informing "under construction", a real-time driving information of another vehicle traveling in an adjacent lane, etc. without being limited thereto. Here, the object or obstacle may include a vehicle, a person, a thing, or the like existing outside the vehicle.

The sensor fusion module 130 may include a LiDAR sensor, a radar, a camera, and/or the like. The sensor fusion module 130 may sense to obtain the object information using the LiDAR, the radar, and/or the camera.

The communication module 150 may transmit and receive various information to and from external server 300, a Ministry of Land, Infrastructure and Transport (MOLIT) server 350.

The autonomous driving module 170 may include a determination unit 171 and a generation unit 173.

The determination unit 171 may collect map data of the first distance range and the second distance range, the first path, the second path, the object information, traffic information, and/or construction information, etc.

The determination unit 171 may provide a more accurate analysis result by further considering a driving state of the vehicle, a driving time zone, and/or the weather, etc. with different weights.

The determination unit 171 may analyze the collected various information and determine whether the vehicle deviates from the first or second path based on the analyzed result. For example, if the analyzed result deviates from a predetermined reference range, the determination unit 171 may determine that the possibility of the vehicle deviating from the path is high and thus generate a detour signal. The determination unit 171 may provide the generated detour signal to the generation unit 173.

If the detour signal is provided from the determination unit 171, the generation unit 173 may generate a third path where the vehicle may travel after deviating from the first path or the second path. For example, the generation unit 173 may generate the third path if the result value determined by the determination unit 171 is out of the reference range. The generation unit 173 may be referred to as a map data processing (MDP) module.

The third path may be a global path where the vehicle may safely and autonomously travel until the navigation 310 confirms the deviation and re-generates a new global path. Preferably, the generation unit 173 may generate the third path before the vehicle deviates from the first path or the second path.

A detailed description of the generation of the third path through the generation unit 173 under the control of the autonomous driving module 170 will be described later.

The external server 300 may include a Korean National Police Agency (KNPA) server 330 and/or a Ministry of Land, Infrastructure and Transport (MOLIT) server 350, etc.

The navigation 310 may receive current vehicle location information and information of the destination. The navigation 310 may include a HD map DB 311. The navigation 310 may extract and provide to the automated driving system 100 HD map from the HD map DB 311 based on the current location information of the vehicle. For example, the navigation 310 may extract the HD map of the first distance range of 0.9 to 1.1 Km ahead of the current location of the vehicle and the second distance range of 250 to 350 m for the other directions.

Additionally or alternatively, the navigation 310 may generate a first path based on a current or inputted location of the vehicle and destination information by use of the SD map. As described above, the first path may be referred to as a global path.

Additionally or alternatively, the navigation 310 may determine whether the first path is likely to be or is deviated, regenerate the first path according to the determination regarding the deviation, and transmit the regenerated global path to the automated driving system 100. For example, the deviation may be confirmed if the real-time current location of the vehicle, provided by the automated driving system 100, is out of a predetermined path error range. For example, the predetermined path error range may be approximately 45 to 55 m. A certain period of time (e.g. approximately 5 to 10 seconds) may be passed until the navigation 310 determining the path deviation and generating the new global path. Alternatively or additionally, the automated driving system 100 may request the navigation 310 for the new global path upon determining the deviation.

The autonomous vehicle may have no countermeasure to handle the situation with no global path provided for the period of time until the navigation 310 provides the new path. Therefore, at least during the time period, the autonomous driving may become unstable.

However, the automated driving system according to the example of the present disclosure may be able to handle the case. In the situation, the automated driving system 100 may generate a global path at least until a new global path is provided by the navigation 310. Also, the automated driving system 100 may collect construction information, traffic information, and information on possibility of cutting-in into an adjacent lane to make a left or right turn during autonomously driving, and generate a detour path in advance before deviating the first path, and may apply the generated detour path until the navigation 310 determines the path deviation and generates a re-routed global path.

The Korean National Police Agency (KNPA) server 330 may provide various traffic information about a path and a road on which the autonomous vehicle travels as well as neighboring roads to the automated driving system 100. For example, the KNPA server 330 may include a traffic DB 331.

The Ministry of Land, Infrastructure and Transport (MOLIT) server 350 may provide the automated driving system 100 with various construction information on the path and the road on which the autonomous vehicle travels as well as neighboring roads. For example, the MOLIT server 350 may include a construction DB 351.

As described above, it is described that the external server 330 may include the KNPA server 330 and the MOLIT server 350, but the present disclosure is not limited thereto, and other external servers may be added in consideration of a driving state of the autonomous vehicle, a state of the vehicle, etc.

Figure 2:
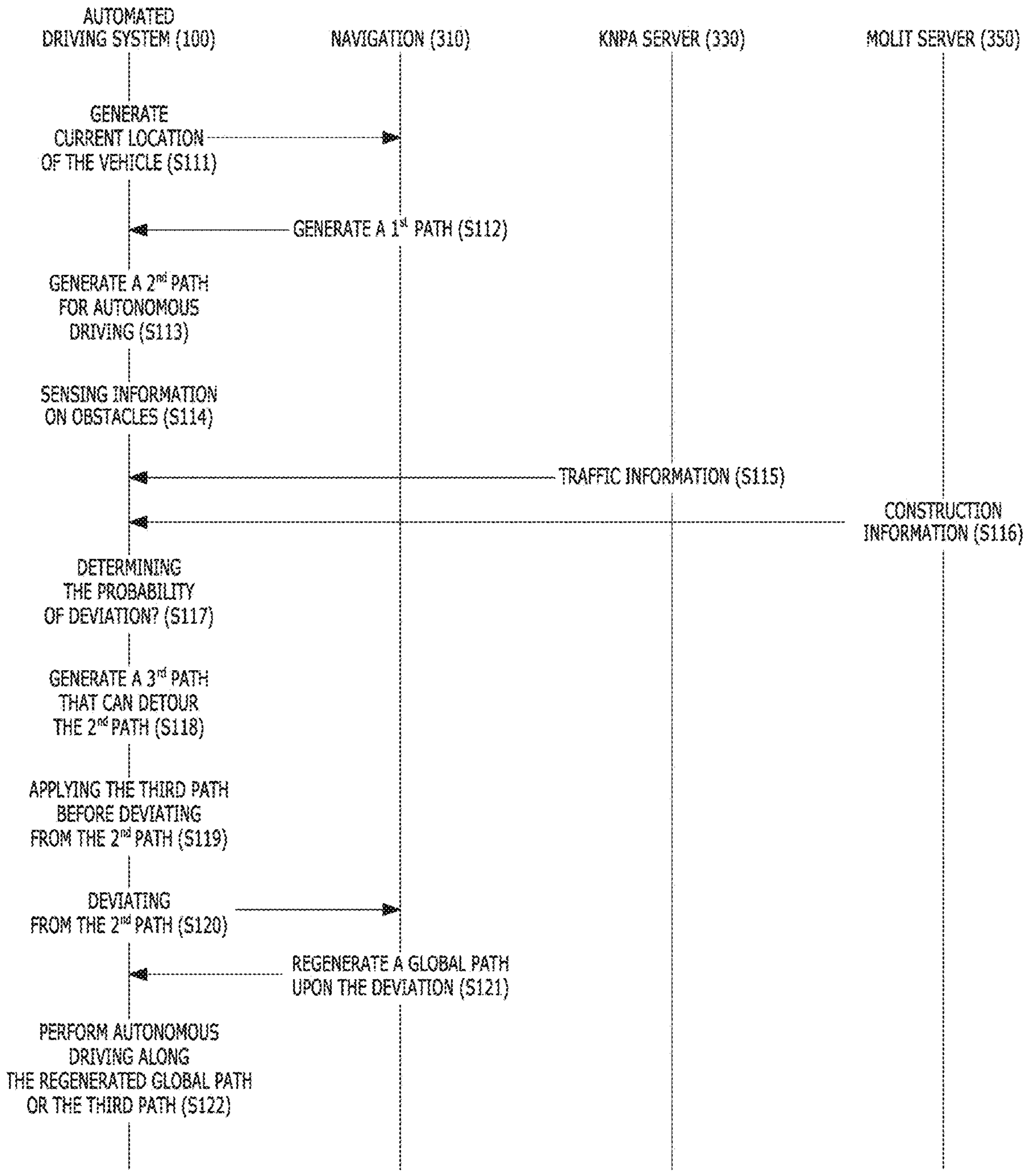
FIG. 2 shows an example of a method steps for autonomous driving shown in FIG. 1.

FIG. 2 is an example of a method for the autonomous driving by the system illustrated in FIG. 1.

Referring to FIG. 2, an operation method for the autonomous driving is as follows.

The automated driving system 100 may determine current location information for the autonomous vehicle based on GPS information provided by the global position system (GPS) under the control of the processor 110 (S111). To this end, the vehicle may comprise a GPS transmitter.

The automated driving system 100 under the control of the processor 110 may transmit the current vehicle location information and destination information through the communication module 150 to the navigation 310. Alternatively or additionally, the navigation 310 may receive the current vehicle location directly from the GPS transmitter.

According to the present disclosure, if the current location information of the vehicle and the destination information are secured, the navigation 310 may generate a first path based on the current location information and the destination information (S112). Also, the automated driving system 100 retrieve HD map about an area including a first distance range ahead of the vehicle and a second distance range of other directions from a memory which may be provided separately from or installed in the navigation 310.

The first distance range may be a distance range of 1 km ahead of the current location of vehicle, and the second distance range may be a distance range of 300 m around the current location of the vehicle.

The automated driving system 100 may generate a second path using the HD map based on the first path, and may perform the autonomous driving following the generated second path (S113).

Here, the second path may be a local path which is lane-level and is made by the generation unit 173 of the autonomous driving module 170 based on the first path i.e. the global path of the navigation system.

The automated driving system 100 of an autonomous vehicle may receive, from the KNPA server 330, various pieces of traffic information about the path or roads on which the autonomous vehicle is traveling as well as neighboring roads (S115), and may receive, from the MOLIT server 350, various pieces of construction information about the path where the autonomous vehicle is traveling, as well as neighboring roads (S116).

Additionally or alternatively, the automated driving system 100 may obtain object information on the second path from the plurality of sensor fusion modules 130 (S114).

For example, the object information may include, alternatively or in addition to information such as the distance to an object, the direction of the object, the speed of the object, road sign information, traffic sign information, road construction sign information, or information of another vehicle running on an adjacent lane or driving information thereof. Here, the object may be a vehicle, a person, and/or a thing, etc., existing outside the autonomous vehicle.

The automated driving system 100 may collect HD map of the first distance range and the second distance range, the first path, the second path, various traffic information, various construction information, and/or object information. The present disclosure is not limited thereto, and the automated driving system 100 may calculate a more accurate analyzed result value by assigning different weight values to various collected information in consideration of the driving state, driving time zone, weather, and/or the like of the vehicle.

The automated driving system 100 may analyze the collected information and determine whether the vehicle has deviated or is likely deviated from the path based on the analyzed result (S117). For example, if the analyzed result is out of the predetermined threshold range, the automated driving system 100 may determine so, generate a detour signal, and generate the third path based on the generated detour signal (S118), and the third path may be referred to as a detour path. A detailed description thereof will be given later in reference to FIGS. 3 to 8.

Here, the detour path may be a path through which the autonomous vehicle may safely and autonomously travel until the navigation 310 decides regarding the deviation and generates a re-routed path for the autonomous vehicle.

The automated driving system 100 may generate the third path before deviating from the first path or the second path.

Thereafter, if the real-time current position of the vehicle provided by the automated driving system 100 is deviated from the first or second path by a predetermined path error range (S120), the navigation 310 may determine that the vehicle deviates from the path, and re-route for the first path to generate a re-routed global path (S121). The navigation 310 may transmit the re-routed global path to the automated driving system 100.

For example, the predetermined path error range may be 50 m. A period of time (approximately 5 to 10 seconds) may be passed during the process of determining the path deviation and generating the re-routed global path.

The automated driving system 100 may previously determine whether the vehicle deviates from the path based on the analyzed result before the signal for the path deviation determination is transmitted from the navigation 310, and thus may perform autonomous driving by applying the third path generated before deviating from the first path or the second path.

The automated driving system 100 may check the re-routed global path provided by the navigation 310 during the autonomous driving on the third path. For example, if it is determined that the re-routed global path continuously includes a closed road, the automated driving system 100 may ignore the re-routed global path and maintain the third path.

On the other hand, if it is determined that the re-routed global path does not continuously include the closed road, the automated driving system 100 may use the re-routed global path instead of the third path to autonomously drive.

FIGS. 3 to 8 show examples of generation of the detour path.

Figure 3:
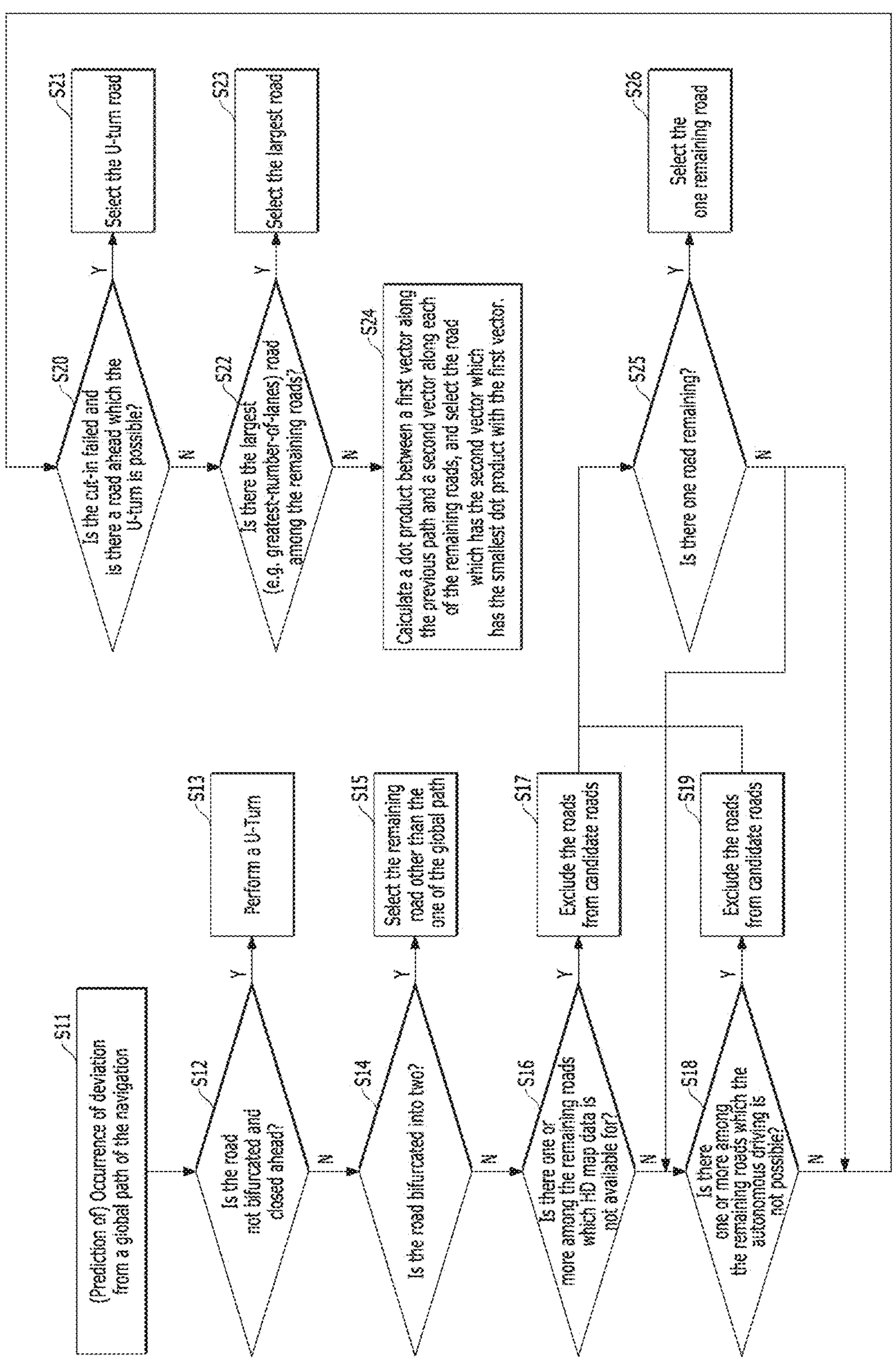
FIG. 3, FIG. 4, FIG. 5, FIG. 6, FIG. 7, and FIG. 8 show examples of generating a detour path.

Referring to FIG. 3, the automated driving system 100 according to an example of the present disclosure may determine or predict whether the global path of the navigation is deviated using the autonomous driving module 170 under the control of the processor 110 (S11). For example, the autonomous driving module 170 may collect HD map of the first distance range and the second distance range, the first path, the second path, various traffic information, various construction information, and object information under the control of the processor 110, analyze the collected information, and/or determine whether the vehicle deviates from the path based on the analyzed result value.

First, in a case where the vehicle is determined to be likely to fail or have failed to turn right or left to follow the first path, if the road which the vehicle will travel or travels on is closed (S12, Yes), the autonomous driving module 170 may generate the third or detour path including a road having a U-turn lane (S13).

And, if the current road is bifurcated into two (S14, Yes), the autonomous driving module 170 may select the remaining road other than the one included in the first path (S15) as included in the detour path (S14).

Figure 4:
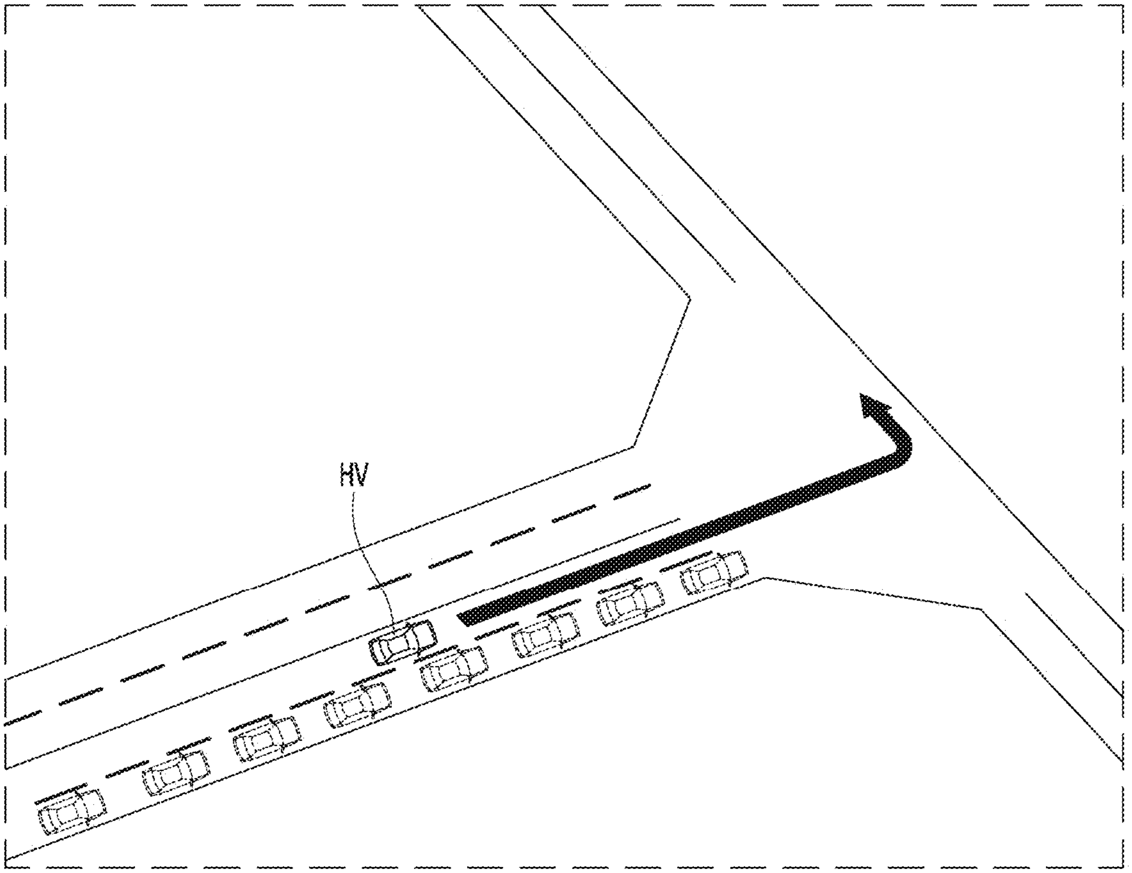

For example, as shown in FIG. 4, in a case where the current road is bifurcated into two and the vehicle HV turns right according to the first path, if the vehicle HV fails to cut in to the right-most lane, the autonomous driving module 170 may generate the detour path including the other road, i.e. a turn-left. For example, if the autonomous vehicle HV fails to cut in due to a large number of nearby vehicles although the right turn is on the global path of the navigation system, a detour path may be generated as including the left turn.

Also, if the current road is dived into two or more roads, the autonomous driving module 170 may set each of the roads as a candidate road for the detour path.

If HD map data is not available for one among the candidate roads (S16, Yes), the autonomous driving module 170 may exclude the road from the candidates (S17).

Figure 5:
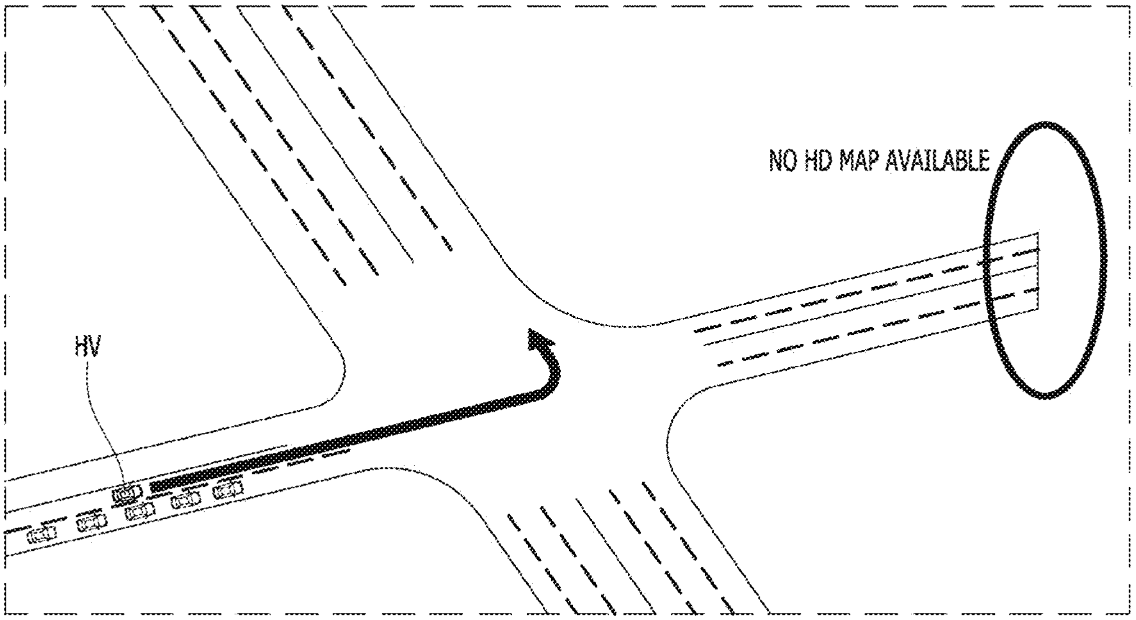

Also, as shown in FIG. 5, if HD map data is not available for one road among the candidates, the autonomous driving module 170 may exclude the road. For example, if one road ends within X[m] on HD map, the road may be excluded from the detour path. For example, referring to FIG. 5, in the case where although the autonomous vehicle HV turns right according to the first (global) path of the navigation, the autonomous vehicle HV may fail to cut in to the right most lane due to a large number of vehicles, the road that goes straight may be excluded from the candidates because the corresponding HD map may not be available after 60 m ahead, and thus the remaining road to turn left may be included in the detour path.

On the other hand, if it is determined that one road among the candidates is not proper for autonomous driving (S18, Yes), the autonomous driving module 170 may exclude the road too from the candidate roads (S19).

By the exclusion of roads as described above, if only one road remains as the candidate (S25, Yes), the autonomous driving module 170 may select the remaining one road as the detour route (S26).

The autonomous driving module 170 may select a U-turn-possible road as the detour path (S21) if the vehicle fails to cut in to the lane to turn left or right according the first path (S20, Yes).

Figure 6:
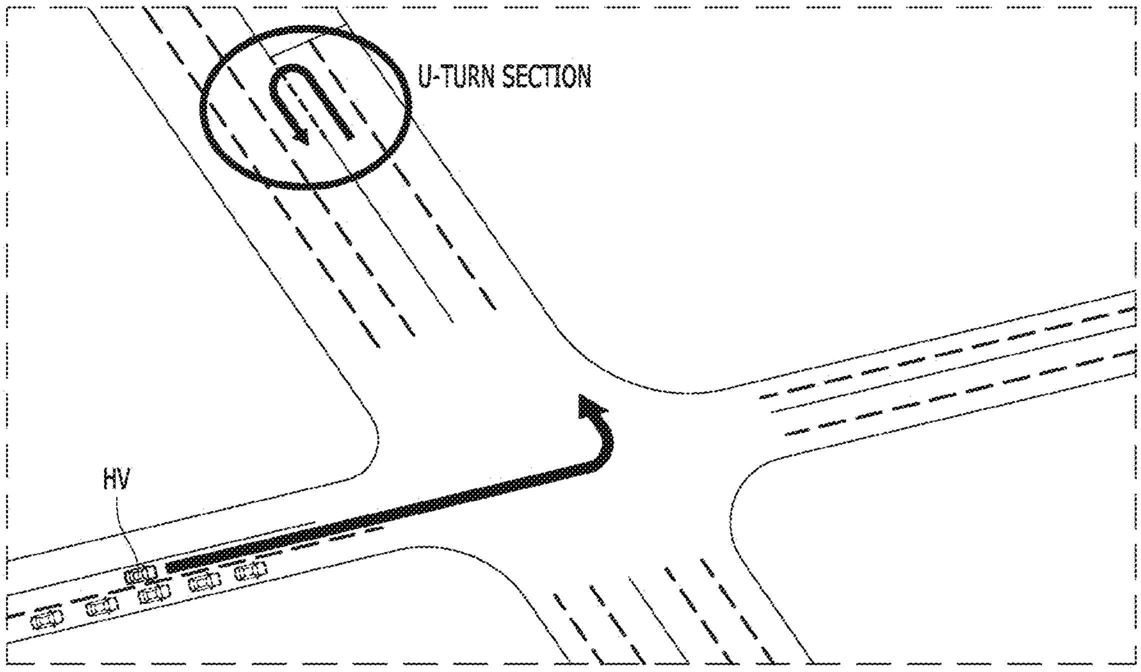

For example, as illustrated in FIG. 6, if there is an autonomous driving prohibited road (e.g. a child protection zone road) within Y[m] ahead among candidate roads, the autonomous driving module 170 may exclude the corresponding road, and select the road with a U-turn lane within Z[m] to generate the detour path. For example, in the case where the vehicle HV turns right but fails to cut in to the right most lane due to a large number of vehicles, the automated driving system 100 may generate the detour path including the left road which has the U-turn lane within Z m.

If there is no U-turn possible road (S20, No) among the candidates, if there is a largest road among the candidate roads (S22, Yes), the autonomous driving module 170 may select the largest road as included in the detour path (S23).

Figure 7:
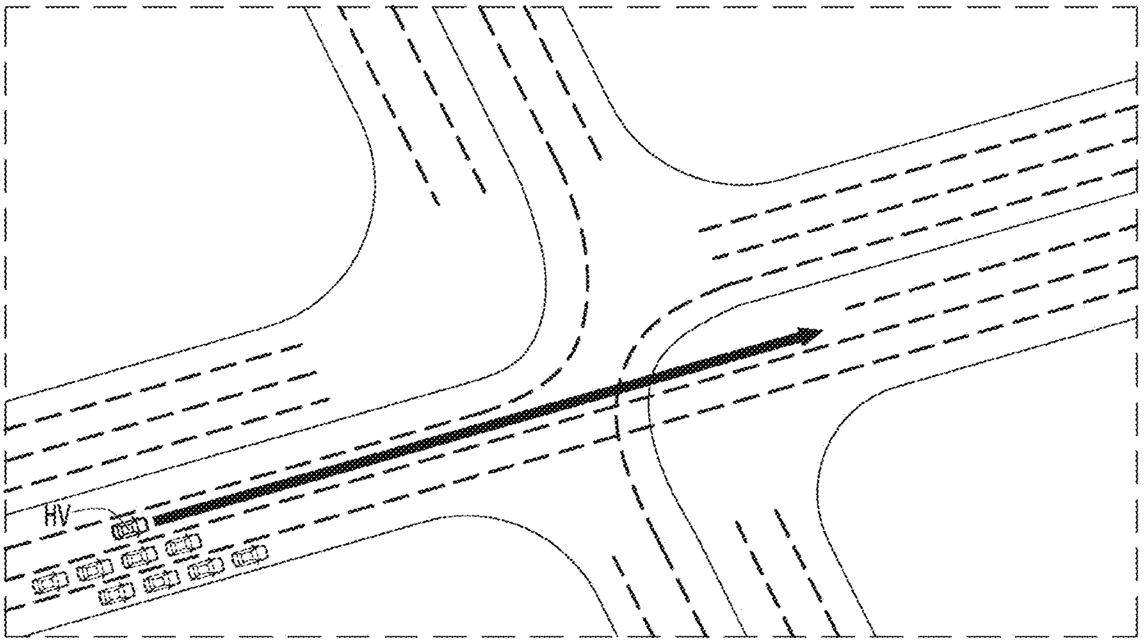

For example, as shown in FIG. 7, the autonomous driving module 170 may select the road with the largest number of lanes among the candidate roads as a priority path and generate the detour path. For example, as shown in FIG. 7, the autonomous driving module 170 select the road to go straight because the number of lanes of the road is 4 in one way and that of the left road is 3 in one way.

If there is no largest road among the candidate roads (S22, No), the autonomous driving module 170 may calculate a dot product between the reference vector which is determined as laid along the right road of the first path and a vector of each candidate road. The autonomous driving module 170 may select the road having the largest calculated dot product as the detour path (S24, No).

Figure 8:
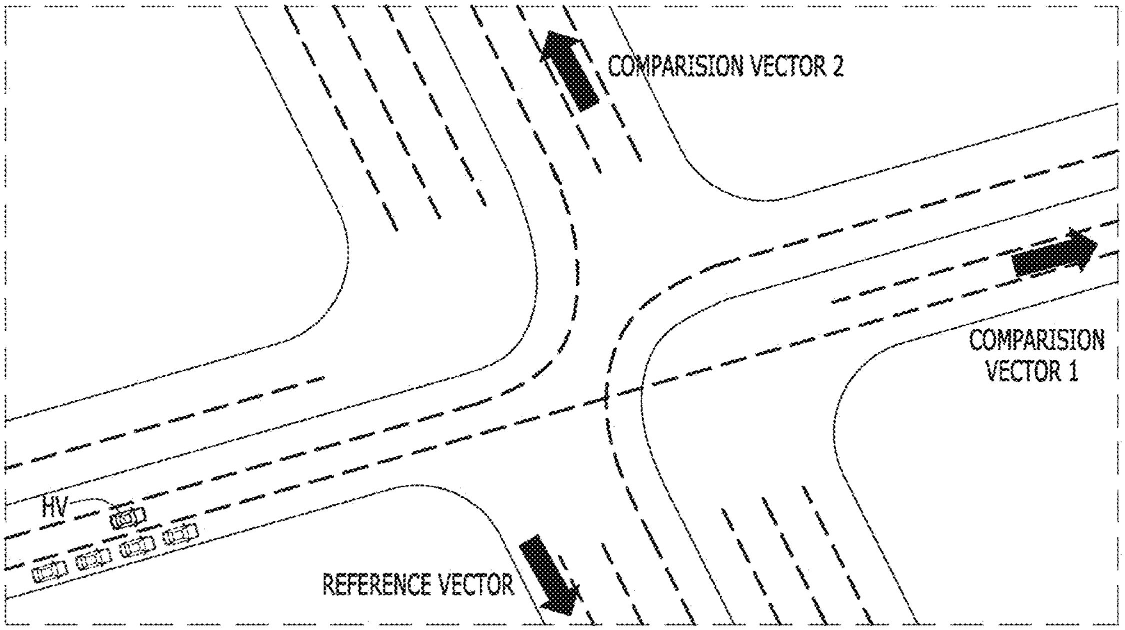

For example, as shown in FIG. 8, the reference vector is determined to be laid along the right road included in the first path and a comparison vector is determined as laid along each candidate road, i.e. the left road and the straight-going road. The autonomous driving module 170 may calculate each dot product between the reference vector and each comparison vector and select, as the detour path, the road having the greatest dot product. In this example, the dot product of the comparison vector 1 and the reference vector is 2 and that of the comparison vector 2 and the reference vector is −0.95, therefore the straight-going road, i.e. the road of the comparison vector 1 is selected as included in the detour path.

Here, the reason for using the dot product is that a road having a smaller dot product is probable to be in the similar direction to the original path.

Figure 9:
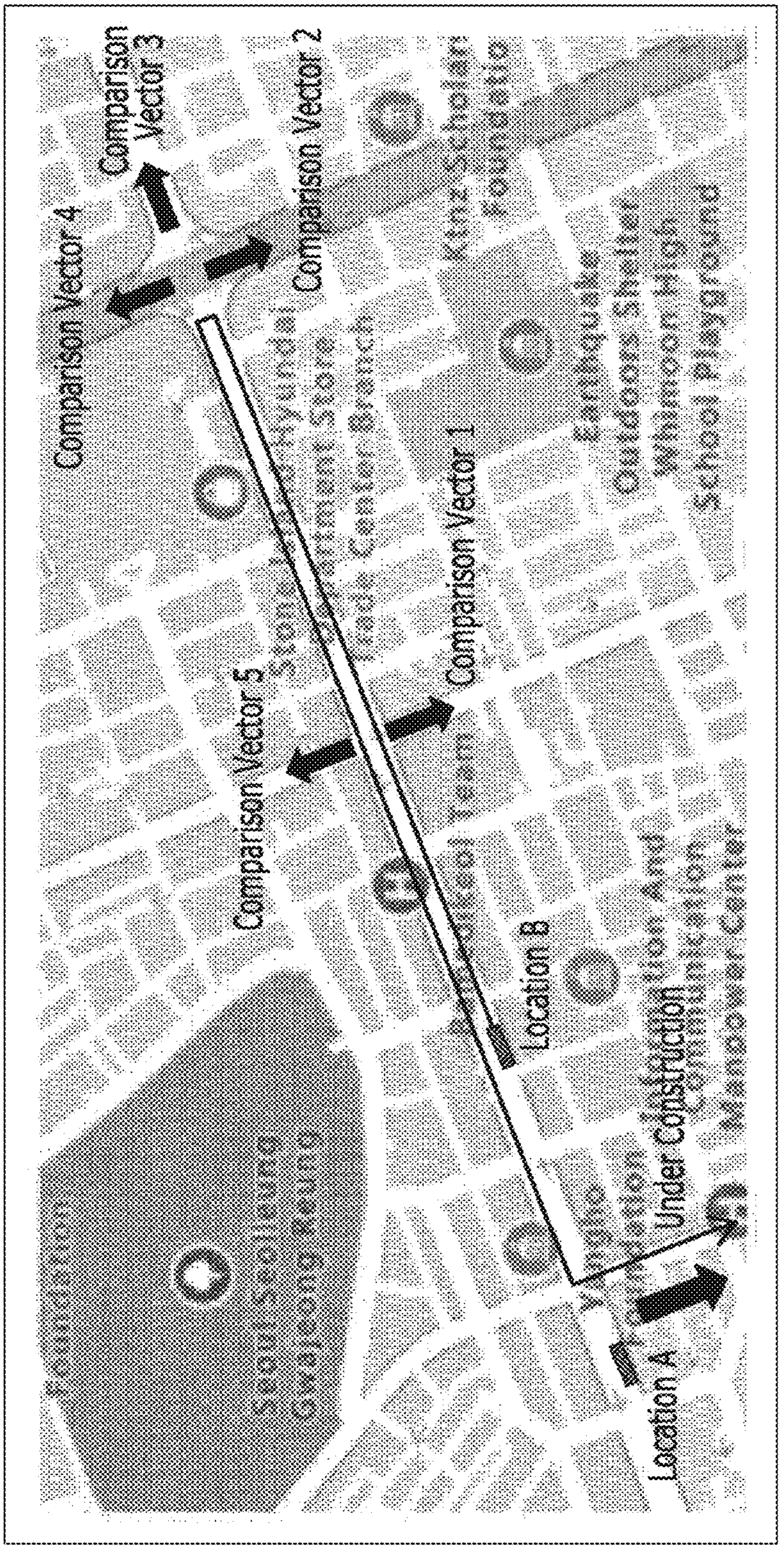
FIG. 9 shows an example of determining a transmitted, re-routed path.

FIG. 9 shows an example of a process of determining a re-routed path transmitted.

Referring to FIG. 9, for example, the automated driving system 100 may receive a regenerated global path from the navigation at the location B after determining to go straight, i.e. deviate from the first path at the location A without turning right which is included in the first path though due to the right road being under construction. As shown in FIG. 9, the regenerated global path may include the road under construction. For the reason, the automated driving system 100 may ignore the re-routed global path and may generate a detour path.

For example, if the newly received path from the navigation is proper, for example, does not guide to the closed road, the automated driving system 100 may autonomously drive a vehicle along the path. However, if the newly received path, i.e., the re-routed global path of the navigation guides to the closed road, the automated driving system 100 may collect candidate roads diverging within [X]m (i.e., 300 m) ahead of the vehicle, select a road that has the greatest dot product with the reference vector of the closed road, and generate a detour global path including the road.

In an example of FIG. 9, the automated driving system 100 may obtain each dot product of five comparison vectors (i.e., comparison vector 1, comparison vector 2, comparison vector 3, comparison vector 4, and comparison vector 5) within x[m] ahead of the vehicle and the reference vector (the closed road under construction).

The automated driving system 100 may select the road having the greatest dot product among the calculated dot products to generate a detour (third) path which is a global path, and may autonomously drive along the global path.

Various examples of the present disclosure are directed to providing an automated system for autonomous driving of a vehicle and a method for the same which allow the vehicle to generate a detour path if the vehicle deviates from a scheduled path or is likely to do so.

An automated system for autonomous driving of a vehicle according to an example of the present disclosure may comprise a non-transitory computer-readable storage medium storing instructions for the autonomous driving, and a processor configured to execute the instructions to cause the vehicle to perform receiving a first path from a navigation system, generating a second path based on the first path and performing the autonomous driving following the second path, determining whether the vehicle deviates from the first or second path by analyzing at least one of information provided from a sensor module of the vehicle or external server, and generating a third path according to a result of the determining.

In at least one example of the present disclosure, the processor may be further configured to cause the vehicle to perform the autonomous driving following the third path until receiving a newly generated path from the navigation system.

In at least one example of the present disclosure, the generating of the second path may include generating the second path based on a high definition (HD) map which covers a first range of 0.9 Km to 1.1 Km ahead of a current location of the vehicle and a second range of 250 m to 350 m in rear of the current location.

In at least one example of the present disclosure, the at least one of information may include at least one of a distance to an object, a direction and a speed of the object, road sign information, traffic information, road construction information, or information of another vehicle running on an adjacent lane or driving information thereof.

In at least one example of the present disclosure, if the vehicle deviates from the first or second path, the processor may be further configured to determine a first road which is along the first path and a plurality of roads directed differently from the first road and obtain a dot product of a first vector along the first road and a comparison vector along each of the plurality of roads.

In at least one example of the present disclosure, the processor may be configured to generate the third path as including a road of which the comparison vector makes a greatest dot product with the first vector among the plurality of roads.

In at least one example of the present disclosure, the first path may include a global path based on a standard definition (SD) map and the second path includes a local path based on a high definition (HD) map.

In at least one example of the present disclosure, if the vehicle deviates from the first or second path, the processor may be further configured to generate the third path as including a road having a greatest number of lanes among a plurality of roads ahead of the vehicle.

In at least one example of the present disclosure, if the vehicle deviates from the first or second path, the processor may be further configured to generate the third path excluding a road which is determined for the vehicle not to be able to be autonomously driven on among a plurality of roads ahead of the vehicle.

In at least one example of the present disclosure, if the vehicle deviates from the first or second path, the processor may be further configured to generate the third path as including a road having a U-turn lane among a plurality of roads ahead of the vehicle.

A method according to an example of the present disclosure is for autonomously driving a vehicle which may comprise an automated system comprising a non-transitory computer-readable storage medium storing instructions for performing the method and a processor configured to execute the instructions and includes receiving a first path from a navigation system, generating a second path based on the first path, determining whether the vehicle deviates from the first or second path by analyzing at least one of information provided from a sensor module of the vehicle or external server, and generating a third path according to a result of the determining.

In at least one method of the present disclosure, the method may further include performing autonomous driving following the third path until receiving a newly generated path from the navigation system.

In at least one method of the present disclosure, the generating of the second path may include generating the second path based on a high definition (HD) map which covers a first range of 0.9 Km to 1.1 Km ahead of a current location of the vehicle and a second range of 250 m to 350 m in rear of the current location.

In at least one method of the present disclosure, the at least one of information may include at least one of a distance to an object, a direction and a speed of the object, road sign information, traffic information, road construction information, or information of another vehicle running on an adjacent lane or driving information thereof.

In at least one method of the present disclosure, the method may further comprise determining a first road which is along the first path and a plurality of roads directed differently from the first road and obtaining a dot product of a first vector along the first road and a comparison vector along each of the plurality of roads.

In at least one method of the present disclosure, the generating of the third path may include generating the third path as including a road of which the comparison vector makes a greatest dot product with the first vector among the plurality of roads.

In at least one method of the present disclosure, the first path may include a global path based on a standard definition (SD) map and the second path includes a local path based on a high definition (HD) map.

In at least one method of the present disclosure, the third path may include a road having a greatest number of lanes among a plurality of roads ahead of the vehicle.

In at least one method of the present disclosure, the third path may exclude a road which is determined for the vehicle not to be able to be autonomously driven on among a plurality of roads ahead of the vehicle.

In at least one method of the present disclosure, the third path may include a road having a U-turn lane among a plurality of roads ahead of the vehicle.

A system or method may collect information on road constructions, traffic situations, or probabilities of other vehicle cutting in and generate a detour path immediately before or after leaving a global or local path to keep the vehicle stably in autonomous driving.

Additionally or alternatively, the system or method may predict a deviation from a global or local path in advance by judging the driving environment with collected road surroundings or information on traffic situations and quickly generate a detour path based on the prediction to maintain the vehicle in the stable autonomous driving.

And, by doing so, the system or method may increase the reliability of the autonomous driving.

Effects obtainable from the present disclosure are not limited to the above-mentioned, and others not mentioned will be clearly understood by those skilled in the art from the following description.

The above-described method of the present disclosure may be implemented as computer-readable codes in a program-recorded medium. The computer-readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, etc.

Although the technical idea of the present disclosure has been described in reference to the accompanying drawings, they only illustrate a preferred example of the present disclosure, without being limited thereto. Further, it is clear that anyone skilled in the art pertained to the present disclosure may make various modifications and imitations without departing from the technical field of the present disclosure.

What is claimed is:

1. An apparatus for driving of a vehicle, the apparatus comprising:
- a processor; and
- a memory storing instructions that, when executed by the processor, cause the apparatus to perform:
  - receiving, from a navigation system, a first path;
  - generating, based on the first path, a second path;
  - autonomously driving, following the second path, the vehicle;
  - analyzing information provided from at least one of a sensor module of the vehicle or an external server;
  - determining, based on an error range and a location of the vehicle, whether the vehicle deviates from the first path or the second path;
  - generating, based on the determining, a third path before the navigation system determines that the vehicle deviates from the first path; and
  - autonomously driving, following the third path, the vehicle, until receiving a newly generated path from the navigation system,
- wherein, based on the vehicle deviating from the first path or the second path, the instructions, when executed by the processor, further cause the apparatus to perform:
- determining a first road which is along the first path and a plurality of roads directed differently from the first road; and
- obtaining a dot product of:
  - a first vector along the first road; and
  - a comparison vector along each of the plurality of roads.

2. The apparatus of claim 1, wherein the generating the second path is based on a high definition (HD) map which covers:
- a first range ahead of a current location of the vehicle; and
- a second range in rear of the current location, the second range being smaller than the first range.

3. The apparatus of claim 1, wherein the information comprises at least one of:
- a distance to an object;
- a direction and a speed of the object;
- road sign information;
- traffic sign information;
- road construction sign information; or
- information of another vehicle driving on an adjacent lane.

4. The apparatus of claim 1, wherein the generating the third path comprises:
- determining, among the plurality of roads, a road of which the comparison vector makes a greatest dot product with the first vector; and
- including the determined road in the third path.

5. The apparatus of claim 1, wherein:
- the first path comprises a global path based on a standard definition (SD) map; and
- the second path comprises a local path based on a high definition (HD) map.

6. The apparatus of claim 1, wherein, based on the vehicle deviating from the first path or the second path, the instructions, when executed by the processor, further cause the apparatus to perform:
- determining, among a plurality of roads ahead of the vehicle, a road having a greatest number of lanes; and
- including the determined road in the third path.

7. The apparatus of claim 1, wherein, based on the vehicle deviating from the first path or the second path, the instructions, when executed by the processor, further cause the apparatus to perform:
- determining, among a plurality of roads ahead of the vehicle, a road on which the vehicle is unable to be autonomously driven; and
- excluding the determined road from the third path.

8. The apparatus of claim 1, wherein, based on the vehicle deviating from the first path or the second path, the instructions, when executed by the processor, further cause the apparatus to perform:
- determining, among a plurality of roads ahead of the vehicle, a road having a U-turn lane; and
- including the determined road in the third path.

9. A method for driving a vehicle, the method comprising:
- receiving, from a navigation system, a first path;
- generating, based on the first path, a second path;
- autonomously driving, following the second path, the vehicle;
- analyzing information provided from at least one of a sensor module of the vehicle or an external server;
- determining, based on an error range and a location of the vehicle, whether the vehicle deviates from the first path or the second path;
- generating, based on the determining, a third path before the navigation system determines that the vehicle deviates from the first path; and
- autonomously driving, following the third path, the vehicle until receiving a newly generated path from the navigation system,
- wherein the method further comprises:
- determining a first road which is along the first path and a plurality of roads directed differently from the first road; and
- obtaining a dot product of:
  - a first vector along the first road; and
  - a comparison vector along each of the plurality of roads.

10. The method of claim 9, wherein the generating of the second path is based on a high definition (HD) map which covers:

a first range ahead of a current location of the vehicle; and a second range in rear of the current location, the second range being smaller than the first range.

11. The method of claim 9, wherein the information comprises at least one of:

a distance to an object;

a direction and a speed of the object;

road sign information;

traffic sign information;

road construction sign information; or information of another vehicle driving on an adjacent lane.

12. The method of claim 9, wherein the generating of the third path comprises:

determining, among the plurality of roads, a road of which the comparison vector makes a greatest dot product with the first vector; and including the determined road in the third path.

13. The method of claim 9, wherein:

the first path comprises a global path based on a standard definition (SD) map; and the second path comprises a local path based on a high definition (HD) map.

14. The method of claim 9, wherein the third path comprises, among a plurality of roads ahead of the vehicle, a road having a greatest number of lanes.

15. The method of claim 9, further comprising:

determining, among a plurality of roads ahead of the vehicle, a road on which the vehicle is unable to be autonomously driven; and excluding the determined road from the third path.

16. The method of claim 9, wherein the third path comprises, among a plurality of roads ahead of the vehicle, a road having a U-turn lane.

17. The method of claim 9, further comprising:

receiving, from the navigation system and based on a location of the vehicle autonomously driving on the third path, the newly generated path;

determining a road portion, of the newly generated path, on which the vehicle is unable to be autonomously driven; and based on the determined road portion, autonomously driving, following the third path, the vehicle.

18. The apparatus of claim 1, wherein the instructions, when executed by the processor, further cause the apparatus to perform:

receiving, from the navigation system and based on a location of the vehicle autonomously driving on the third path, the newly generated path;

determining a road portion, of the newly generated path, on which the vehicle is unable to be autonomously driven; and based on the determined road portion, autonomously driving, following the third path, the vehicle.

19. An apparatus for driving of a vehicle, the apparatus comprising:

a processor; and a memory storing instructions that, when executed by the processor, cause the apparatus to perform:

receiving, from a navigation system, a first path;

generating, based on the first path, a second path;

autonomously driving, following the second path, the vehicle;

analyzing information provided from at least one of a sensor module of the vehicle or an external server;

determining, based on an error range and a location of the vehicle, whether the vehicle deviates from the first path or the second path; and generating, based on the determining, a third path, wherein, based on the vehicle deviating from the first path or the second path, the instructions, when executed by the processor, further cause the apparatus to perform:

determining a first road which is along the first path and a plurality of roads directed differently from the first road; and obtaining a dot product of:

a first vector along the first road; and a comparison vector along each of the plurality of roads.

* * * * *